Feb. 20, 1962 M. T. WEISS 3,022,466

FERROMAGNETIC PARAMETRIC MICROWAVE AMPLIFIER

Filed Nov. 7, 1957

INVENTOR
M. T. WEISS

BY Roy M. Porter, Jr.

ATTORNEY

United States Patent Office 3,022,466

Patented Feb. 20, 1962

3,022,466

FERROMAGNETIC PARAMETRIC MICROWAVE AMPLIFIER

Max T. Weiss, Elizabeth, N.J., assignor to Bell Telephone Laboratories, Incorporated, New York, N.Y., a corporation of New York Filed Nov. 7, 1957, Ser. No. 695,104

3 Claims. (Cl. 330—56)

Figures 1, 2, 3:
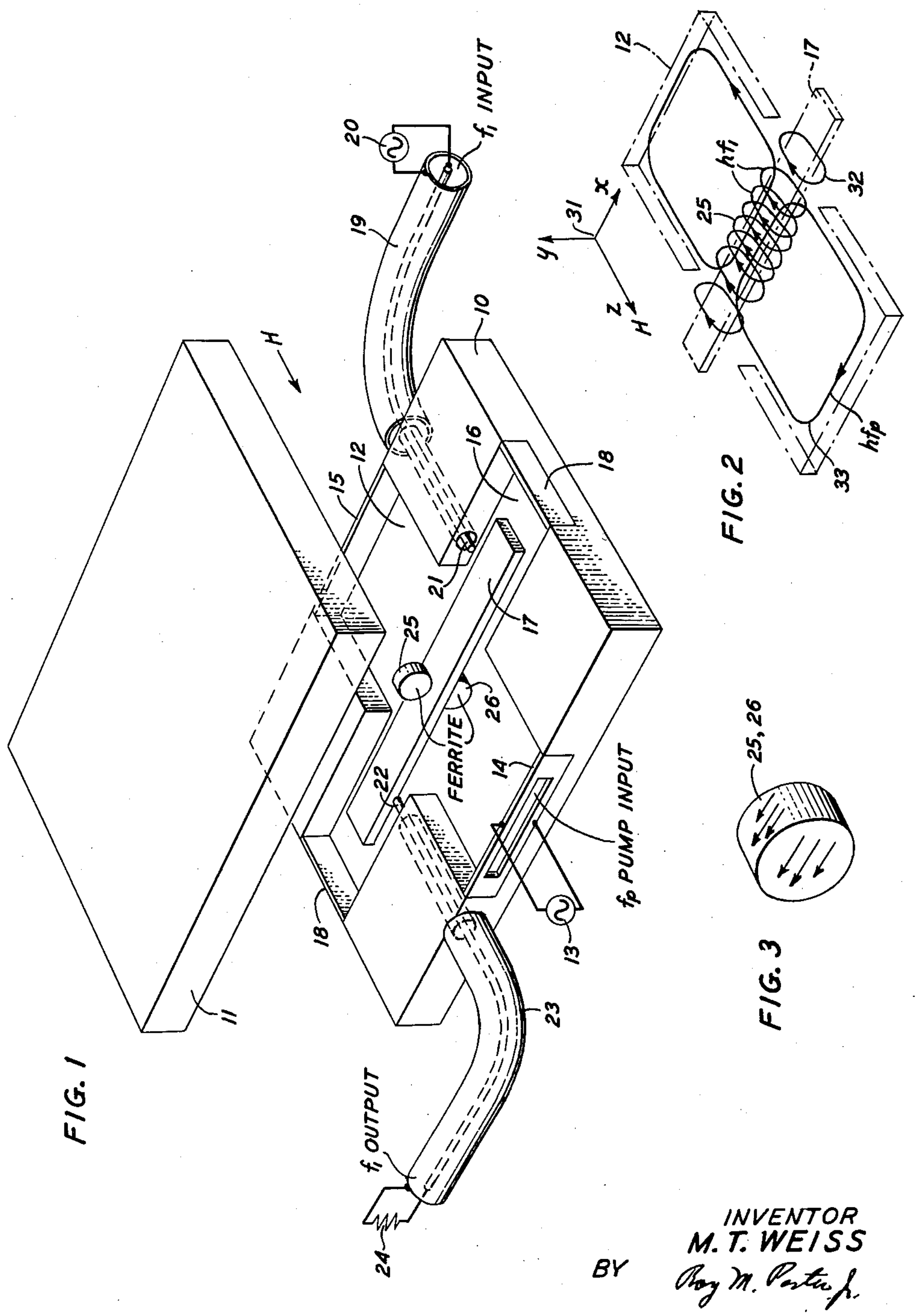

This invention relates to the generation and amplification of extremely high frequency or microwave signals and, more particularly, to low noise gyromagnetic oscillators and amplifiers.

In my copending application, Serial No. 660,280 filed August 20, 1957, now United States Patent 2,978,649, issued April 4, 1961, a low noise amplifier is disclosed operating upon the principles outlined by H. Suhl in his copending application Serial No. 640,464 filed February 15, 1957, since abandoned, and in his article "Proposal for a Ferromagnetic Amplifier in the Microwave Range" in the Physical Review, volume 106, page 384, April 15, 1957, that if energy is injected into an oscillatory system containing gyromagnetic material, it is possible, under proper conditions, to produce low noise amplification.

Specifically, in my copending application there is disclosed a conductively bounded enclosure for electromagnetic waves having substantially separate but physically intersecting resonators each capable of supporting an independent wave field within distinct frequency bands. An element of gyromagnetic material polarized by a steady magnetic field is located in this enclosure at the intersection of the resonators so that it is disposed in a region occupied in common by said fields. Power, at what has been referred to as the pumping frequency $f_p$, is applied to one of the resonators with a magnetic field component perpendicular to the steady magnetic field. Under these conditions the magnetization of the gyromagnetic material will precess at $f_p$ to produce a component of magnetization oscillating perpendicular to the steady field. The signal to be amplified at a frequency $f_1$ is applied to the other resonator with a magnetic field component that is parallel to the steady field. This modulates the steady field so that the resonant precession frequency of the magnetization is varied at frequency $f_1$. The gyromagnetic material causes a mixing of $f_1$ and $f_p$ to produce a radio frequency component of magnetic field at a frequency $f_p-f_1=f_2$ perpendicular to the steady field direction. This new frequency will hereinafter be referred to as the idler frequency. In a like manner the idler frequency $f_2$ will produce a field at the frequency $f_p-f_2=f_1$ parallel to the steady field.

Thus, a feedback system is realized that results in the production of a negative resistance. As discussed in detail in the above-noted references, when the magnitude of the pumping energy $f_p$ exceeds a definable threshold value, the system is unstable and goes into sustained self-oscillations. However, by limiting the pumping energy below this level, the system is stable. Signal energy to be amplified at the frequency $f_1$ may be introduced into the system. It may be withdrawn at the same frequency in amplified form.

It has been recognized in accordance with the present invention that losses in the idler frequency system are significantly responsible for inefficiencies in the amplifier and substantially increase the amount of pumping power required for a given amplification. These losses are attributed to two factors. The first of these has to do with the resistive loss inherent in a resonant circuit and associated with the sharpness of resonance characteristic or the Q of that circuit. As will be shown hereinafter, a substantial decrease in the pumping power required can be realized by employing an extremely narrow band idler circuit with a very high Q. The second factor has to do with the parameter referred to in the art as the "filling factor," i.e., the degree of concentration of microwave energy within the gyromagnetic element itself. Thus, the greater the concentration of idler frequency power within the element, the less total pumping power is required to produce a given gain.

It is, therefore, an object of the present invention to improve and increase the efficiency of low noise ferromagnetic oscillators and amplifiers.

It is a further and more specific object of the present invention to increase both the Q and the filling factor associated with the idler frequency circuit to correspondingly decrease the pumping power required and increase the efficiency of ferromagnetic oscillators and amplifiers of the type described.

These objects are accomplished in accordance with the invention by employing as the resonant circuit for the idler frequency a recently discovered ferromagnetic mode of oscillation designated the magnetostatic resonance mode. This mode can be excited in specially shaped and specially polarized bodies cut from single crystal gyromagnetic materials. The resonance in this mode is of very high Q and the resonant field is substantially entirely contained within the body itself. Thus, as compared to the field contained by the body when it is the cavity in which the body is located that is resonant, the concentration of electromagnetic wave energy within the body is very high. More particularly, the resonant cavity for the idler frequency as employed in my copending application is replaced by a thin disk of single crystal gyromagnetic material oriented with the plane of the disk perpendicular to the steady polarizing magnetic field and perpendicular to the magnetic field of the signal frequency energy. A resonant idler frequency field will therefore be excited within the disk having magnetic field components parallel to the plane of the disk. This field has components that bear the proper relationship to the signal frequency field and to the steady biasing field within the disk to produce amplification.

These and other objects, the nature of the present invention, its advantages and features, will appear more fully upon consideration of the specific illustrative embodiment described in detail with respect to the accompanying drawings in which:

FIG. 1 is a perspective view of an embodiment of the invention;

FIG. 2, given for the purposes of explanation, is a diagrammatical showing of the component magnetic field pattern of the signal energy and the pumping energy in the embodiment of FIG. 1; and FIG. 3, given for the purposes of explanation is a diagrammatical showing of the magnetic field pattern of the idler frequency energy in the ferrite magnetostatic mode in the embodiment of FIG. 1.

Referring more particularly to FIG. 1, a perspective view of an illustrative embodiment of the present invention is shown connected and utilized to produce amplification at microwave frequencies. Such an amplifier comprises two intersecting resonators which, for convenience, have been integrally constructed by milling or casting them in a block 10 having a suitable cover plate 11. The first of these resonators is of the wave guide type and comprises a rectangular channel 12 in block 10 having a wide dimension of greater than one-half wavelength and less than one wavelength at the pumping frequency $f_p$. The input end of channel 12 is connected to a source 13 of pumping frequency $f_p$ through an iris 14. The other end of channel 12 is terminated in a reflecting member 15. The distance between iris 14 and reflector 15 is a multiple of one-half wavelengths to produce resonance at the frequency $f_p$ as will be discussed hereinafter.

The second resonator is of the strip transmission-line type and comprises a channel 16 extending at right angles to channel 12. The wide dimension of channel 16 is small enough so that it is beyond cut-off at the frequency $f_p$ and, therefore, does not interfere with the resonant cavity formed by channel 12. Suitably supported within channel 16 and extending longitudinally therein in a plane parallel to the top and bottom walls of channel 16 is a thin conductive member 17. Together with the top and bottom walls of channel 16, serving as the conductive ground planes therefor, member 17 forms a strip transmission line wave supporting structure 16—17. Member 17 may have cross-sectional dimensions that are somewhat smaller than the corresponding dimensions of channel 16. Member 17 is centered between the wide walls of channel 16 and extends an equal distance on either side of channel 12. Both ends of channel 16 may be terminated by conductive plates 18 for improved shielding.

A wave at the frequency $f_1$ to be amplified is launched upon the resulting strip transmission-line 16—17. As illustrated the wave is applied from source 20 by way of coaxial conductor 19 and capacitive probe 21 extending through block 10 to a point adjacent to member 17 of line 16—17 in accordance with usual practice. The amplified output signal may then be taken from the other end of line 16—17 by a similar capacitive probe 22 connected by coaxial conductor 23, to load 24. The electrical length of conductive member 17, which determines the electrical length of strip transmission line 16—17, is a multiple of half wavelengths to produce resonance at frequency $f_1$ as will be described hereinafter.

In accordance with the invention, the resonant circuit for the idler frequency $f_2$ is provided by magnetostatic resonance set up within bodies 25 and 26 located respectively above and below member 17. The art is now quite familiar with the phenomenon of gyromagnetic resonance that occurs in polycrystalline ferrite materials subjected to the combined action of a unidirectional biasing magnetic field of the proper intensity and an orthogonally directed microwave radio field. This resonance results from a uniform precession of electron spins within the material. It has properties much like those of a low Q tuned circuit and shows a tendency to absorb a substantial portion of the energy at a particular frequency. The frequency at which the resonance occurs appears to be a direct function of the strength of the biasing field. More recently discovered is a resonance termed "magnetostatic" that occurs (in addition to the uniform precession type of resonance) in very small bodies of material cut from single crystals of gyromagnetic material. Certain aspects of this resonance are disclosed in a paper by L. R. Walker, entitled, "Magnetostatic Modes in Ferromagnetic Resonance" published in the Physical Review, volume 105, pages 390–394, January 15, 1957 and further aspects are described in the copending application of J. F. Dillon, Jr. Serial No. 571,226 filed March 13, 1956. Magnetostatic resonance is characterized by a frequency spaced plurality of very narrow band resonances each of low absorption and high Q. It is profoundly influenced by the shape of the gyromagnetic body and the direction in which the biasing field is applied relative to this shape as well as by the strength of the biasing field.

For example, a tiny sphere or cube of single crystal material will exhibit a magnetostatic resonance line of width that is perhaps ten times narrower than the resonance line width of the uniform precessional type in polycrystalline materials. If the single crystal material is in the form of a disk, the line width is even narrower than the spheroidal form and the more extreme the aspect ratio, i.e., the greater the ratio of diameter to thickness thereof, the sharper the resonant peaks. Further, it has been found that the sharpness of resonance is substantially greater in the disk when the oscillating radio frequency field is parallel to the plane of the disk and the biasing field is normal to the plane of the disk than when the reverse relationships exist. Comparative data will be given hereinafter for the purpose of illustration.

Thus, to achieve the sharp resonance required by the principles of the present invention at the idler frequency $f_2$, bodies 25 and 26 take the form of very thin disks cut from single crystals of any suitable low loss gyromagnetic material such as magnesium ferrite, manganese ferrite or yttrium-iron garnet. In a particular embodiment, a thickness that is $\frac{1}{10}$ or less than the diameter has proved satisfactory. Such disks are oriented with the plane of their diameters normal to the axis of channel 12 and perpendicular to the axis of channel 16. A particular advantage of the present invention resides in the small amount of material required which is a particularly important feature in view of the difficulty of obtaining large samples of single crystal material. Furthermore, the desirability of keeping the volume of the material small to reduce dielectric losses is also favored by the invention.

Suitable means not illustrated in detail are provided for supplying a steady external magnetic field to disks 25 and 26 as represented on FIG. 1 by the vector H directed in substantially the plane of channels 12 and 16 and perpendicular to the longitudinal axis of channel 16. The significance of this field direction as well as the significance of other factors mentioned hereinbefore may be more easily understood in connection with an examination of the magnetic field patterns of wave energy supported upon a strip transmission line 16—17, within resonator 12, and in the magnetostatic mode in the disks 25 and 26.

Referring, therefore, to FIG. 2, the outlines of the boundaries of cavity 12 and of the conductor 17 of strip transmission line 16—17 are shown in a coordinate system represented by the mutually perpendicular vectors 31, the $x$ vector indicating a sense along the transverse wide dimension of cavity 12, the $y$ vector along the transverse narrow dimension of cavity 12, and the $z$ vector along the longitudinal direction of cavity 12 and perpendicular to the axis of conductor 17.

The magnetic field loops of the signal frequency $f_1$ are illustrated by the closed loops 32 encircling conductor 17 and lying in planes perpendicular to its axis that vary in intensity sinusoidally along the length of the conductor. Conductor 17 is a multiple of half wavelengths long so that it is resonant at the frequency $f_1$ and, more specifically, extends an odd number of quarter wavelengths on either side of the region including disks 25 and 26 so that the magnetic field at the ends of conductor 17 are zero with a maximum in the vicinity of disks 25 and 26. Thus, in the region of disks 25 and 26 the signal frequency $f_1$ produces a maximum field in the $z$ direction.

The magnetic field loops of the pumping frequency $f_p$ are illustrated by the closed loops 33 comprising the standing wave pattern set up in cavity 12. These loops lie in planes which are parallel to the wide dimension of cavity 12. In accordance with the invention, cavity 12 is a multiple of half wavelengths long and, more specifically, extends a whole number of half wavelengths on either side of the region including disks 25 and 26 so that the magnetic field in this region is maximum and exists substantially in the $x$ direction.

FIG. 3 shows the magnetization distribution in the ferrite that is believed to represent the magnetostatic mode at the idler frequency $f_2$. The magnetization has a resultant that lies in the $x$ direction and a pattern of field distribution in the $z$ direction as illustrated. This represents the resonant mode having the sharpest resonant characteristic.

It may now be noted that there is no direct field coupling between the field of $f_1$ represented by loops 32, and the field of $f_p$ represented by loops 33. The $x$ component of $f_p$ is always normal to the component of $f_1$ and $z$ component of $f_p$ couples in canceling amounts on opposite sides of the conductor 17 with the $z$ component of $f_1$. Similarly, the electric field of $f_1$ is oppositely directed above and below conductor 17, and cannot couple to the unidirectional field of $f_p$ in channel 12. Furthermore, the wide dimension of channel 12 renders it beyond cut-off at the frequency $f_1$ and the wide dimension of channel 16 renders it beyond cut-off at the frequency $f_p$. Thus, the pump frequency power will not couple directly to the strip transmission line 17 and into the load 24.

The exclusive coupling between the fields is provided by the gyromagnetic material of disks 25 and 26. This coupling is such that the criteria set forth by Suhl are met.

In operation as a microwave amplifier, a band of frequencies centered about $f_1$ to be amplified are applied from source 20 to strip transmission line 16—17. A suitable idler frequency $f_2$ is selected at one of the magnetostatic resonance modes in elements 25 and 26. A certain amount of control of the frequency at which these resonances occur is had by the selection of the shape of elements 25 and 26, more particularly, by their aspect ratios, and by the strength of the steady field H. It is preferable that the operating resonance be selected so that other magnetostatic resonances do not coincide with the frequency $f_1$ or the frequency $f_2+f_1$. Having made this selection, the pumping frequency $f_p$ is selected so that $f_p=f_1+f_2$. The required pumping power is applied from source 13 with an intensity less than the threshold level. The transverse component of the field $f_1$ as supported on line 16—17 is parallel to the steady field H and modulates the resonant frequency of the precession resulting from the component of the pumping field $f_p$ perpendicular to the steady field. Modulaton products associated with the frequency $f_2$ are produced that have components parallel to the plane of the ferrite disks 25—26 and can, therefore, excite an oscillatory magnetostatic mode therein at $f_2$. In turn the components $f_2$ are recoupled through the gyromagnetic material to line 16—17 resulting in amplification of the band associated with the frequency $f_1$. Amplified components may be delivered by coaxial cable 23 to load 24. Modulation products associated with $f_2$ exist only in the gyromagnetic material 25—26 and do not reach the output.

In the above-described arrangements it has been specified that channel 12 be resonant at the frequency of the pumping power $f_p$. This is desirable in order to obtain the greatest concentration of the transverse field components of the pumping power in the vicinity of the gyromagnetic elements. In addition, the dual dependence of the magnetostatic resonant frequency upon the biasing field strength and upon the shape makes it possible to select these parameters so that disks 25 and 26 exhibit gyromagnetic resonance of the uniform precessional type at the pumping frequency $f_p$ in addition to magnetostatic resonance at the idler frequency $f_2$. Under this condition, the pumping power requirements are further reduced.

Much emphasis has been placed hereinbefore upon the shape and orientation of disks 25 and 26 as these factors bear upon the improvements and efficiencies resulting from the present invention. Comparative data typical for practical devices will serve to illustrate the nature of this improvement. Thus, it is possible to compare (*a*) a typical Q for the idler frequency circuit, (*b*) the filling factor for a gyromagnetic element disposed in or forming a part of this circuit and (*c*) the relative pumping power intensity required for a given operation in the devices:

I. An amplifier in accordance with prior disclosures in which the resonant circuit for the idler frequency is of the cavity resonance type.

II. An amplifier in which the resonant circuit for the idler frequency is of the magnetostatic type in which the gyromagnetic element takes the form of a sphere.

III. An amplifier in which the resonant circuit for the idler frequency is of the magnetostatic type in which the gyromagnetic element takes the form of a disk biased parallel to the plane of the disk; and IV. An amplifier in accordance with a preferred embodiment of the present invention in which the resonant circuit for the idler frequency is of the magnetostatic type in which the gyromagetic element takes the form of a disk biased normal to the plane of the disk.

For comparison the gyromagnetic body in each case has equal volume. The comparison is shown by the following table:

| | (*a*) Q for idler frequency circuit | (*b*) Filling factor | (*c*) Relative pump power |
|---|---|---|---|
| I. Electromagnetic cavity | 500 | 0.1 | 1.0 |
| II. Magnetostatic sphere | 250 | 0.3 | 0.6 |
| III. Magnetostatic disk-bias parallel | 500 | 0.3 | 0.3 |
| IV. Magnetostatic disk-bias perpendicular | 3,000 | 0.3 | 0.05 |

A comparison between device I and device II will indicate that the decrease in pumping power required is primarily a result of the substantial increase in the filling factor resulting from the increased magnetic field intensity within the gyromagnetic element caused by magnetostatic operation. The improvement between devices II and III or between III and IV is seen to be the result of the increased Q of the magnetostatic resonance resulting from the shape and orientation of the element.

If the magnitude of the pumping power $f_p$ is increased above the threshold level, self-oscillation will commence, and components at the frequency $f_1$ will be available from coaxial cables 19 and 23.

In all cases, it is understood that the above-described arrangements are merely illustrative of the principles of the invention. Numerous and varied other embodiments may be devised in accordance with these principles by those skilled in the art without departing from the spirit and scope of the invention.

What is claimed is:

1. A high frequency signal amplifier comprising a composite conductively bounded enclosure for electromagnetic waves having substantially electrically separate but physically intersecting wave paths each capable of supporting an independent wave field within distinct frequency bands centered about a pumping frequency $f_p$ and a signal frequency $f_s$ lower than $f_p$ respectively, an element of magnetically polarizable material capable of exhibiting gyromagnetic effects within said bands of frequencies having an aspect ratio between its greatest and smallest dimensions substantially different than unity disposed at the intersection of said paths in a region occupied in common by said fields, means for inducing magnetostatic resonance in said material at a frequency $f_p—f_s$ comprising a steady magnetic field applied to said element in a direction parallel to said smallest dimension, means for coupling wave energy to both said paths and means for extracting amplified wave energy from one of said paths.

2. The combination according to claim 1 wherein said element is a thin disk of single crystal gyromagnetic material.

3. First and second resonant cavities comprising two intersecting conductively bounded channels having top and bottom walls, a thin conductive strip supported within one of said channels extending longitudinally therein with the broad faces thereof parallel to said top and bottom walls and proportioned to be resonant at a first frequency $f_1$, the second of said cavities proportioned to be resonant at a second frequency $f_2$ higher than said first frequency, a circular disk of magnetically polarizable material capable of exhibiting gyromagnetic effects at said frequencies $f_1$ and $f_2$ and having an axial dimension less than the diameter of its circular surfaces disposed adjacent to at least one face of said strip in a region of said intersecting channels common to both of said cavities with the planes of said circular surfaces perpendicular to said top and bottom walls, means for inducing magnetostatic resonance in said disk at a frequency $f_2-f_1$ comprising a steady magnetic polarizing field applied to said disk in a direction perpendicular to said circular surfaces, means for coupling electromagnetic wave energy to said first and said second cavities at frequencies $f_1$ and $f_2$ respectively, and means for removing amplified wave energy at frequency $f_1$ from said first cavity.

References Cited in the file of this patent

UNITED STATES PATENTS

| | | |
|---|---|---|
| 2,743,322 | Pierce et al. | Apr. 24, 1956 |
| 2,755,447 | Engelmann | July 17, 1956 |
| 2,782,280 | Bickford | Feb. 19, 1957 |
| 2,806,138 | Hopper | Sept. 10, 1957 |
| 2,810,882 | Walker | Oct. 22, 1957 |
| 2,815,488 | Von Neumann | Dec. 3, 1957 |
| 2,817,813 | Rowen et al. | Dec. 24, 1957 |
| 2,825,765 | Marie | Mar. 4, 1958 |
| 2,922,125 | Suhl | Jan. 19, 1960 |
| 2,948,870 | Clogston | Aug. 9, 1960 |

OTHER REFERENCES

Chang et al.: "Proceedings of the IRE," July 1958, pages 1383–1386.

"Journal of Applied Physics," April 1957, page 511.

Melchor et al.: "Proceedings of the IRE," May 1957, pages 643–646.

Ayers et al.: "Journal of Applied Physics," February 1956, pages 188–189.

Manley et al.: "Proceedings of the IRE," July 1956, pages 904–913.